(12) United States Patent
Machida et al.

(10) Patent No.: US 6,178,843 B1
(45) Date of Patent: Jan. 30, 2001

(54) RACK GUIDE IN RACK AND PINION TYPE STEERING SYSTEM

(75) Inventors: Katsuhiro Machida; Nobumitsu Mabuchi; Yasuo Ido, all of Nagoya (JP)

(73) Assignee: Daido Metal Company LTD, Nagoya (JP)

( * ) Notice: Under 35 U.S.C. 154(b), the term of this patent shall be extended for 0 days.

(21) Appl. No.: 09/124,984

(22) Filed: Jul. 30, 1998

(30) Foreign Application Priority Data

Sep. 26, 1997 (JP) .................................................. 9-262347

(51) Int. Cl.[7] ........................................................ B62D 3/12
(52) U.S. Cl. ......................... 74/498; 74/388 PS; 74/422; 384/276; 384/279; 384/291
(58) Field of Search ............................ 74/388 PS, 498, 74/422; 384/276, 279, 299, 300, 907, 908, 909, 291

(56) References Cited

U.S. PATENT DOCUMENTS

| | | | |
|---|---|---|---|
| 3,623,379 | * 11/1971 | Bradshaw et al. | 74/498 |
| 4,008,627 | * 2/1977 | Bradshaw et al. | 74/498 |
| 4,218,933 | * 8/1980 | Allen et al. | 74/498 |
| 4,593,578 | * 6/1986 | Kobayashi et al. | 74/498 |
| 5,265,691 | * 11/1993 | Konishi et al. | 74/498 |
| 5,433,532 | * 7/1995 | Kawageo et al. | 384/279 |
| 5,447,774 | * 9/1995 | Tanaka et al. | 384/908 |
| 5,778,731 | * 7/1998 | Heep | 74/498 |

FOREIGN PATENT DOCUMENTS

| | | |
|---|---|---|
| 58-209653 | * 12/1983 | (JP) . |
| 1-027984 | 8/1989 | (JP) . |

* cited by examiner

*Primary Examiner*—Thomas R. Hannon
*Assistant Examiner*—William C Joyce
(74) *Attorney, Agent, or Firm*—Browdy And Neimark

(57) ABSTRACT

In a rack guide disposed in a casing of a rack and pinion type steering system for slidably supporting a rack bar having rack teeth which engage with a pinion rotatably supported in the casing, the area for bearing the load of the rack bar can be fixed. A slide bearing member 21 has a three-layered structure consisting of a backing metal 22 made of bronze, a sintered alloy layer 23 and a synthetic resin layer 24, the surface of the synthetic resin layer 24 comprising sliding-contact surface portions 25, 26 formed intermittently with the center thereof at the center of curvature "O" of a circular outer peripheral surface of a rack bar 16 and with a radius of curvature equal to the radius of curvature $R_0$ of the same, and the remaining surface portions 27 to 29 formed in other positions than the sliding-contact surface portions 25, 26 so as to be more dented than the sliding-contact surface portions 25, 26.

8 Claims, 3 Drawing Sheets

RACK GUIDE IN RACK AND PINION TYPE STEERING SYSTEM

BACKGROUND OF THE INVENTION

The present invention relates to a rack guide in a rack and pinion type steering system, which supports a rack bar, and more specifically to the rack guide whose sliding frictional resistance against the rack bar is reduced.

Conventionally, a rack and pinion type steering system comprises a pinion provided at an end of a steering shaft and a rack bar having rack teeth which engage with the pinion through which rotation of the steering shaft or the pinion is transformed into reciprocating motion of the rack bar.

In such rack and pinion type steering system, the pinion is rotatably supported in a housing through bearings, while the rack bar is supported in such a manner that a hemi-cylindrical back surface thereof opposite to the teethside is slidable on a rack guide disposed in the housing. The rack guide is formed by mounting a slide bearing member on a supporting base. The slide bearing member usually comprises a backing metal having an arc shape and a synthetic resin layer coated on the backing metal as an inner surface layer so as to support the rack bar on the surface of the synthetic resin layer.

High sliding frictional resistance between the rack guide and the rack bar makes the efficiency of the steering system to be deteriorated, so as to affect on the steering characteristics. To cope with this, it is proposed, for example, in JP-Y2-1-27984 to reduce the contact area between a rack bar and a synthetic resin layer of a slide bearing member in order to reduce the sliding frictional resistance between a rack guide and the rack bar.

According to a specific structure of JP-Y2-127984 for reducing the contact area between the rack bar and the slide bearing member, as shown in the attached drawing of FIG. 6, the rack bar 2 is partially in contact with a synthetic resin layer 1 of the slide bearing member at two restricted linear zones of the surface of the synthetic resin layer 1. The linear zones are located within two surface sections, respectively, which are defined by a symmetrical center line corresponding to the curvature center (line) of the hemi-cylindrical back surface of the rack bar 2 being received in the slide bearing member, the symmetrical center line dividing the hemi-cylindrical back surface of the rack bar 2 to the two surface sections 3 and 4. In FIG. 6, a reference character "LS" means a phantom line which includes the curvature center "O" of the hemi-cylindrical back surface of the rack bar 2 and the above symmetrical center line on the surface of the synthetic resin layer 1. The surface of the synthetic resin layer 1 consists of the two cylindrical surface sections 3 and 4 which have curvature centers "Oa" and "Ob", respectively. The curvature centers "Oa" and "Ob" are located above the curvature center "O" in FIG. 6. Thus, the radii of curvature "Ra" and "Rb" of the two cylindrical surface sections 3 and 4 are greater than that of the radius of curvature "Ro" of the rack bar.

In such structure, however, the hemi-cylindrical back surface of the rack bar 2 is almost in linear contact with the synthetic resin layer 1 at the respective two surface sections 3 and 4. This means that the synthetic resin layer 1 bears the rack bar 2 by small areas. Thus, the bearing load per unit area is considerably large resulting in that the slide bearing member has an inferior durability. Further, the synthetic resin layer 1 is elastically deformed during supporting the rack bar 2 so as to be dented in a circular-arc form along the respective two linear zones being in contact with the hemi-cylindrical back surface of the rack bar 2. Such deformation amount is different from one steering system to another due to variance errors in size of components, the variance errors occurring in assembling the steering systems, and so on. Consequently, the contact area between the synthetic resin layer 1 and the hemi-cylindrical back surface of the rack bar 2 varies from one steering system to another. Thus, the sliding frictional resistance between the synthetic resin layer 1 and the rack bar 2 is different from one steering system to another resulting in a problem that the fabrication quality is unstable in producing such steering systems.

SUMMARY OF THE INVENTION

The present invention is proposed under such technical background and an object thereof is to provide a rack guide in a rack and pinion type steering system, whose slide bearing member can have a long lifetime and a constant load bearing area.

Thus, there is provided a rack guide in a rack and pinion type steering system, in which the rack guide is mounted in a casing of the steering system to slidably support a rack bar which is reciprocatingly driven by a pinion being rotatably supported in the casing, the rack guide consisting of a supporting base and a slide bearing member which is mounted on the supporting base and which has a cross-sectional circular-arc profile, wherein the slide bearing member comprises a backing metal layer and a liner formed on the backing metal, the liner comprising a synthetic resin layer which forms an inner surface of the rack guide and which is brought into sliding contact with the rack bar;

the inner surface of the rack guide consists of sliding-contact surface portions and remaining surface portions, all of which are elongated longitudinally and which are circumferentially distinguished from one another;

the sliding-contact surface portions which are entirely in sliding contact with the rack bar and have a cross sectional circular-arc profile with a predetermined circumferential length, respectively and which are continuous to the adjacent remaining surface portions; and the remaining surface portions are radially more recessed or dented than the sliding-contact surface portions.

According to such structure, since the synthetic resin layer of the rack guide bears the rack bar at the sliding-contact surface portions partially formed in the inner surface of the rack guide, the contact area between the rack bar and the synthetic resin layer is comparatively small so that the sliding frictional resistance can be reduced. Moreover, the sliding-contact surface portions have a predetermined circumferential length, respectively so that the rack bar is in band-zone contact with the synthetic resin layer but not be in linear contact therewith. Thus, the bearing load per unit area is small resulting in a long lifetime of the steering system. Besides, the remaining surface portions adjacent to the sliding-contact surface portions are more recessed from the latter, therefore even if the sliding-contact surface portions are elastically deformed radially outwardly under a load from the rack bar, the contact area between the rack bar and the sliding-contact surface portions will never increase so that the fabrication quality becomes stable in producing such steering systems.

Alternatively, a porous sintered alloy layer may be coated on the inner surface of a back metal and a synthetic resin layer is formed on the porous sintered alloy layer by way of impregnating the resin into the alloy layer. According to such structure, frictional heat generated between the synthetic resin layer and the rack bar is easily transmitted to the backing metal through the porous sintered alloy layer so that the rack guide has excellent heat radiation property.

The backing metal may be made from a metal having excellent heat conductivity such as bronze. Since bronze is hard to be corroded and has high thermal conductivity, frictional heat produced between the synthetic resin layer and the rack bar is easily dissipated.

According to one embodiment of the invention, a cylindrical hollow protrusion with a bottom may be provided to the backing metal, which protrudes radially outwardly to be fitted into a positioning opening formed in the supporting base. The inner space of the hollow protrusion can be used as a reservoir for a lubricant so that the lubricant is stably supplied to the sliding-contact surface between the synthetic resin layer and the rack bar over a long term.

PREFERRED EMBODIMENT OF THE INVENTION

Now, an embodiment of the present invention will be described with reference to FIGS. 1 to 5.

Figure 5:
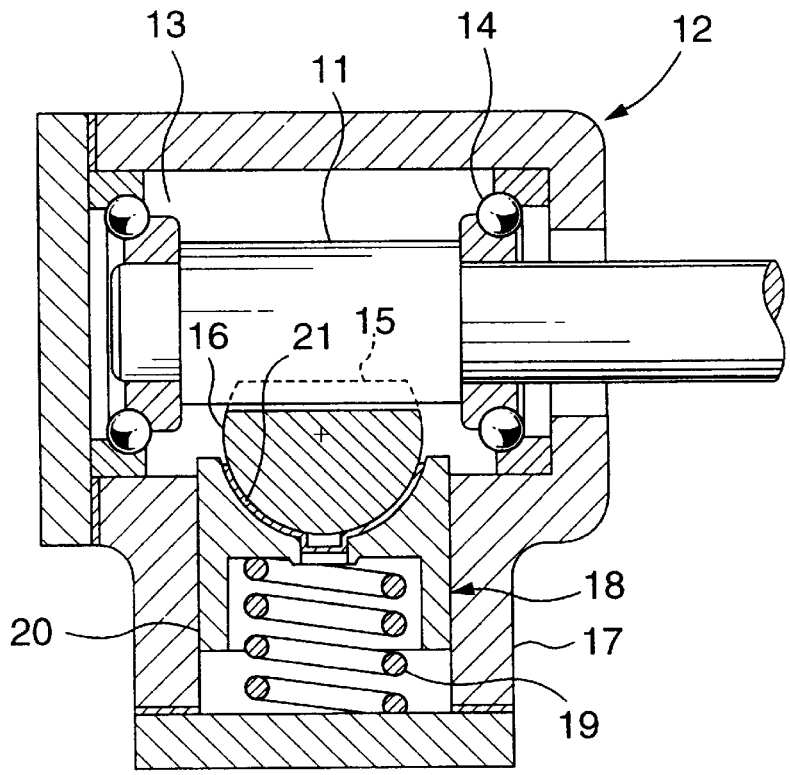
FIG. 5 is a general vertical sectional view of the embodiment.

Referring to FIG. 5 which shows a general structure of a rack and pinion type steering system, a steering shaft is provided with a pinion 11 at an end thereof, the pinion 11 being contained in a casing 12 and rotatably supported by means of bearings 13 and 14. In the casing 12, there is also disposed a rack bar 16 having rack teeth 15 which engage with the pinion 11. Both opposite ends of the rack bar 16 extend out of the casing 12.

The casing 12 has a cylindrical hollow projection 17 integrally formed therewith. There is located the rack bar 16 between the projection 17 and the pinion 11. A rack guide 18 for slidably supporting the rack bar 16 is disposed in the projection 17 so as to be reciprocatingly movable along the axis of the cylindrical hollow projection 17 or perpendicularly to the axis of the rack bar 16. The rack guide 18 is biased toward the rack bar 16 by means of a compression coil spring 19 as a resilient biasing means disposed between the bottom of the projection 17 and the rack guide 18.

Figure 2:
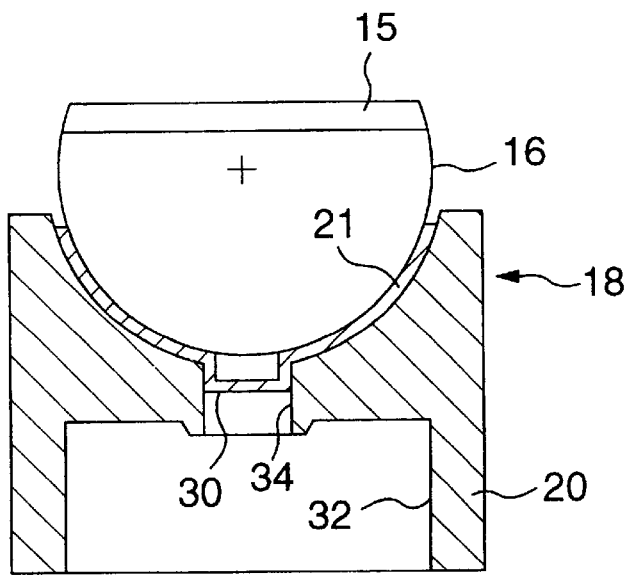
FIG. 2 is a sectional view of a rack guide of the embodiment.

The rack guide 18 comprises a supporting base 20 and a slide bearing member 21 as shown in FIG. 2. The slide bearing member 21 (see FIG. 4) is of a three-layered structure consisting of a backing metal 22, a sintered alloy layer 23 formed on the back metal 22 and a thin synthetic resin layer 24 formed on the porous sintered alloy layer 23 by way of impregnation of a synthetic resin.

The backing metal 22 is made of a metal (e.g. bronze) having a higher thermal conductivity than ferrous alloys, and the sintered alloy layer 23 is made from a copper alloy powder. The synthetic resin layer 24 consists of from 1 to less than 20 vol % of lead fluoride, 1 to 30 vol % of a lead-tin alloy containing 3 to 30 wt % tin, and the balance substantially of polytetrafluoroethylene, a total content of the lead fluoride and the lead-tin alloy being 2 to 35 vol %, and which has self-lubricating property.

Figure 1:
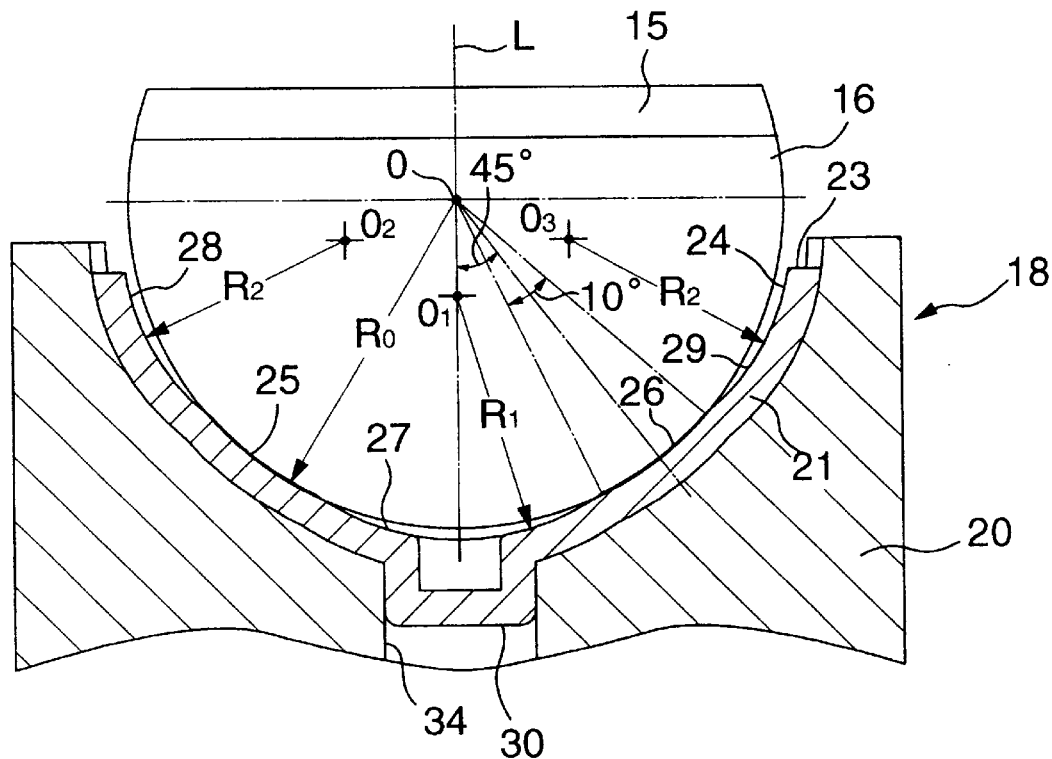
FIG. 1 is an enlarged sectional view showing essential portions of an embodiment of the invention rack and pinion type steering system.

The slide bearing member 21 is formed from a composite plate material by way of the press forming, which is the above mentioned three-layered structure consisting of a backing metal, a sintered alloy layer and a synthetic resin layer, so as t o have a hemi-cylindrical form. According to the press forming, as can be seen in FIG. 1, the synthetic resin layer 24 is provided with sliding-contact surface portions 25 and 26, and remaining surface portions 27, 28 and 29. The sliding-contact surface portions 25 and 26 are located at both sides of a symmetric center line "L" of the slide bearing member 21 and the rack bar 16 fitted on the slide bearing member 21, and have a common radius of curvature "Ro" equal to that of the hemi-circular peripheral surface of the rack bar 16. The remaining surface portions 27, 28 and 29 are located between and on the outer sides of the sliding-contact surface portions 25 and 26, and have radii of curvature "$R_1$" and "$R_2$", as shown in FIG. 1, which are smaller than the radius of curvature "Ro".

More specifically, the sliding-contact surface portions 25 and 26 are located on circumferential both sides of the symmetric center line "L" and circumferentially away from the same by an angle of 45°, and respectively has a circular-arc profile having a predetermined circumferential width (for example, an angle of 10°), a center of curvature "O" on the symmetric center line "L" and the radius of curvature "Ro". Among the remaining surface portions 27, 28 and 29, the portion 27 between the sliding-contact surface portions 25 and 26 has a circular-arc profile having a center of curvature "$O_1$" on the symmetric center line "L" and the radius of curvature "$R_1$" being smaller than the radius of curvature "Ro". And the portions 28 and 29 being located at opposite circumferential end regions have a circular-arc profile, respectively, having centers of curvature "$O_2$" and "$O_3$", and having a radius of curvature "$R_2$" being smaller than the radius of curvature "Ro".

The slide bearing member 21 is integrally provided with a protrusion 30 by the press forming, which protrudes radially outwardly from the outer surface of the backing metal 22 and is located on the center line of the slide bearing member 21, namely, the center line of the surface portions 27 of the synthetic resin layer 24. The protrusion 30 is of a cylindrical blind hole member which opens radially inwardly.

Figure 3:
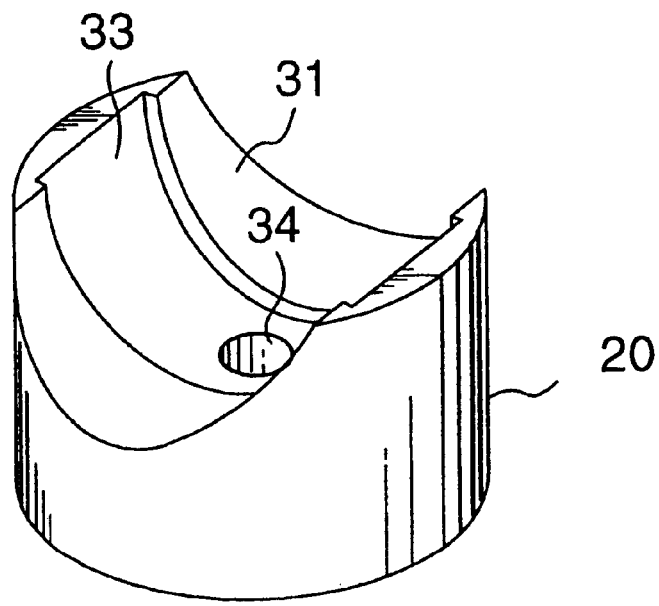
FIG. 3 is a perspective view of a support of the embodiment.
Figure 4:
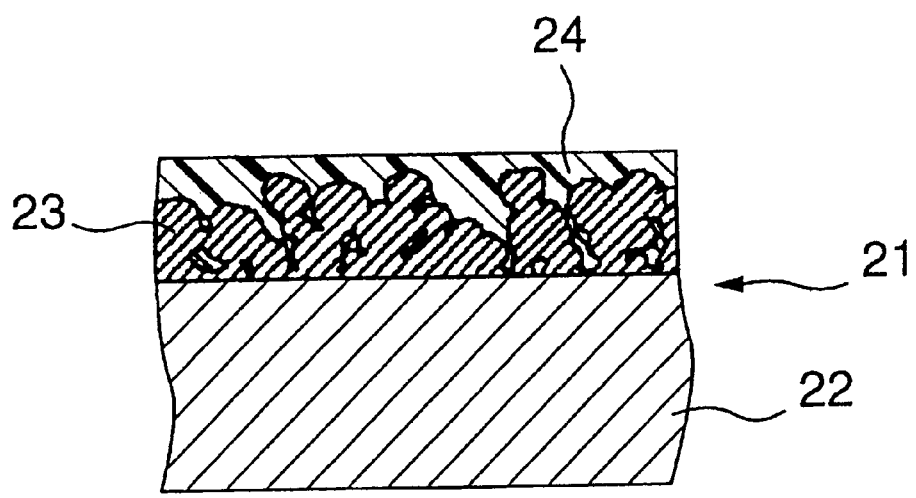
FIG. 4 is a partial sectional view of a slide bearing member of the embodiment.

The supporting base 20 is a generally cylindrical member which is made of a sintered alloy for example and which is formed so as to have a hemi-circular supporting seat portion 31 in the top end section and a cylindrical hollow portion 32 in the bottom end section (see FIGS. 2 and 3). The supporting seat portion 31 is provided with a recess 33 into which the slide bearing member 21 is fitted. A through hole 34 is formed in the center of the recess 33 in order to circumferentially position the slide bearing member 21.

The bottom surface of the recess 33 has a hemi-circular arc profile being in conformity with the back surface of the backing metal 22 of the slide bearing member 21 which is provided with a hemi-circular arc shape with a plurality of curvatures.

When assembling the rack guide 18, the slide bearing member 21 is fitted into the recess 33 such that the protrusion 30 of the backing metal 22 is engaged into the through hole 34.

In a state where the rack guide 18 is assembled into the casing 12 of the rack and pinion type steering system, the synthetic resin layer 24, which is an inner surface layer of the slide bearing member 21 of the rack guide 18, slidably supports the peripheral back surface of the rack bar 16. More specifically, the sliding-contact surface portions 25 and 26 on both sides of the symmetric center line "L" (FIG. 1) are in slidably contact with the rack bar 16 so as to support the latter, but the remaining surface portion 27, 28 and 29 are not in contact with the peripheral back surface of the rack bar 16 since the remaining surface portion 27, 28 and 29 are more recessed than the sliding-contact surface portions 25 and 26.

As described above, according to the present embodiment, the rack bar 16 is not in contact with the entire surface of the synthetic resin layer 24 but only with the sliding-contact surface portions 25, 26 thereof located in two positions on both sides of the symmetric center line "L". Therefore, unlike the case in which the rack bar 16 is supported by the entire surface of the synthetic resin layer 24, the sliding contact occurs in the limited portions of small area, with the result that the sliding frictional resistance against the rack bar 16 can be reduced to thereby provide the steering system with a good efficiency.

Figure 6:
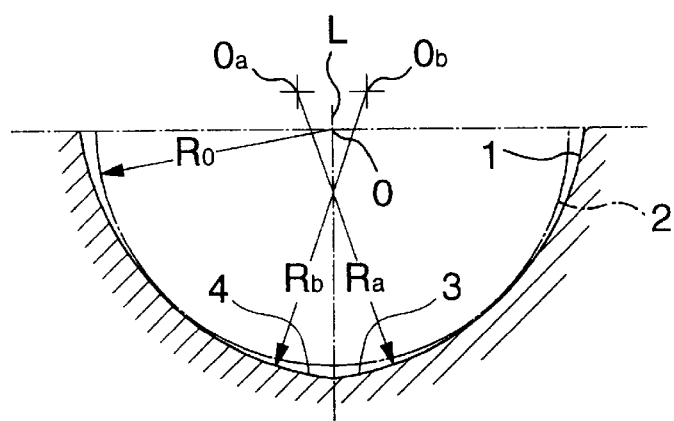
FIG. 6 is an enlarged sectional view of a conventional rack and pinion type steering system, which is similar to FIG. 1.

Further, since the sliding-contact surface portions 25, 26 have a predetermined circumferential width, respectively, they are in surface contact with the rack bar 16, and accordingly the load applied per unit area is lowered as compared with the case of the conventional structure shown in FIG. 6 in which the rack bar is in almost linear contact with the synthetic resin layer, thereby making sure of a long lifetime.

The remaining surface portions 27, 28 and 29 located on both sides of the sliding-contact surface portions 25, 26 are formed with the radii of curvature $R_1$, $R_2$ which are smaller than the radius of curvature $R_0$ of the sliding-contact surface portions 25, 26 and divided from the sliding contact surface portions 25, 26 at the points of inflection, and therefore even if the synthetic resin layer 24 is elastically deformed by the load from the rack bar 16, the area of contact between the rack bar 16 and the synthetic resin layer 24 will never be increased and, if it is increased, an increment thereof will be very small. In consequence, the area of sliding contact between the rack bar 16 and the synthetic resin layer 24 is fixed and the sliding frictional resistance expected originally can be obtained, and therefore the fabrication quality is stable. Further, by adjusting the length of arc of the sliding-contact surface portions 25, 26, it is possible to obtain the desired sliding frictional resistance.

In the present embodiment, since the sintered alloy layer 23 is formed between the synthetic resin layer 24 and the backing metal 22, the heat generated due to the sliding movement of the rack bar 16 on the synthetic resin layer 24 is easily transmitted to the backing metal 22 through the sintered alloy layer 23, and, what is more, since the backing metal 22 is made of bronze having a high thermal conductivity, the heat transmitted to the backing metal 22 is easily transmitted from the backing metal 22 to the supporting base 20, and accordingly the synthetic resin layer 24 can be cooled with a high efficiency and occurrence of seizure or other trouble can be restrained.

Besides, the protrusion 30 projectingly formed on the slide bearing member 21 for positioning of the slide bearing member 21 relative to the supporting base 20 is formed in the shape of a cylindrical hollow member with a bottom, so that it is possible to reserve lubricant grease in the protrusion 30. Generally, lubrication between the rack bar 16 and the slide bearing member 21 is ensured with grease applied to the surface of contact between them when assembling, and however, by reserving grease in the protrusion 30, it is possible to replenish the surface of contact between the rack bar 16 and the slide bearing member 21 with grease over a long period, thus making sure of a long lifetime.

The present invention is not limited to the embodiment described above and shown in the drawings but may be embodied more widely or modified in the following forms.

The remaining surface portions 28, 29 located on the outer sides of the sliding-contact surface portions 25, 26 may be used as grease reservoirs.

The backing metal material is not limited to bronze but may be stainless steel, aluminum alloy and so on.

The protrusion 30 may be provided in the sliding-contact surface portions 25, 26, while the area of the sliding-contact surface portions has not to be reduced in the case where the protrusion 30 is provided in the remaining surface portion 27.

What is claimed is:

1. A rack guide for a rack and pinion steering system, in which the rack guide is mounted in a casing of the steering system so as to slidably support a rack bar which is reciprocatingly driven by a pinion being rotatably supported in the casing, the rack guide comprising supporting base and an elongated slide bearing member which is mounted on the supporting base and which has a circular-arc cross-sectional profile, wherein the slide bearing member comprises a backing metal layer and liner formed on the backing metal, the liner comprising a synthetic resin layer which forms an inner surface of the rack guide and which is brought into sliding contact with the rack bar;

the inner surface of the rack guide, having said circular-arc cross-sectional profile, comprises circular-arc concave sliding-contact surface portions (25, 26) and circular-arc concave remaining surface portions (27, 28, 29), all of which are elongated longitudinally and which are circumferentially distinguished from one another;

the sliding-contact surface portions (25, 26) are entirely in sliding contact with the rack bar and have a cross sectional circular-arc profile with a predetermined circumferential length having a first radius of curvature ($R_0$), and which are continuous to the adjacent remaining surface portions; and the remaining surface portions (27, 28, 29) are radially more recessed than the sliding-contact surface portions with first and second remaining surface portions (28, 29) being located adjacent the edges of said circular-arc profile and each having a second radius of curvature ($R_2$) which is less than said first radius of curvature ($R_o$), and with a third remaining surface portion (27) being located between said sliding-contact surface portions (25, 26) along a symmetric center line (L) of a said profile and having a third radius of curvature ($R_1$) which is less than said first radius of curvature ($R_o$).

2. A rack guide according to claim 1, wherein the liner comprises a porous sintered alloy layer which is directly formed on the backing metal layer and impregnated with the synthetic resin of the synthetic resin layer which covers the porous sintered alloy layer.

3. A rack guide according to claim 1, wherein the backing metal layer is made of a metal including bronze which has excellent thermal conductivity.

4. A rack guide according to claim 1, wherein the backing metal layer comprises a cylindrical hollow protrusion with a bottom, which is to be fitted into a positioning opening being formed in the supporting base.

5. The rack guide of claim 1, wherein said third radius of curvature ($R_1$), less then said first radius of curvature ($R_0$), is greater then said second radius curvature ($R_2$).

6. The rack guide of claim 1 wherein said sliding-contact surface portions (25, 26) are spaced away from said symmetric center line (L) by an angle about 45° and wherein each said sliding-contact surface portion (25, 26) has a circumferential angular width of about 10°.

7. The rack guide of claim 5 wherein said sliding-contact contact surface portions (25, 26) are spaced away from said symmetric center line (L) by an angle of about 45°.

8. A rack guide for a rack and pinion steering system, in which the rack guide is mounted in a casing of the steering system so as to slidably support a rack bar which is reciprocatingly driven by a pinion being rotatably supported in the casing, the rack guide comprising a supporting base and an elongated slide bearing member which is mounted on the supporting base and which has a circular-arc cross-sectional profile, wherein the slide bearing member comprises a backing metal layer and a liner formed on the backing metal, the liner comprising a synthetic resin layer which forms an inner surface of the rack guide and which is brought into sliding contact with the rack bar;

the inner surface of the rack guide, having said circular-arc cross-sectional profile, comprises circular-arc concave sliding-contact surface portions (25, 26) and circular-arc concave remaining surface portions (27, 28, 29), all of which are elongated longitudinally and which are circumferentially distinguished from one another;

the sliding-contact surface portions (25, 26) are entirely in sliding contact with the rack bar and have a cross sectional circular-arc profile with a predetermined circumferential length having a first radius of curvature ($R_0$), and which are continuous to the adjacent remaining surface portions; and the remaining surface portions (27, 28, 29) are radially more recessed than the sliding-contact surface portions with first and second remaining surface portions (28, 29) being located adjacent the edges of said circular-arc profile and each having a second radius of curvature ($R_2$) which is less than said first radius of curvature ($R_0$), and each of which has a center point ($O_2$, $O_3$) located (1) between a symmetric center line (L) of a said profile and said supporting base, and also (2) within a semicircular area defined by said circular-arc cross-sectional profile; and with a third remaining surface portion (27) being located between said sliding-contact surface portions (25, 26) along said symmetric center line (L) of a said profile and having a third radius of curvature ($R_1$) which is less than said first radius of curvature ($R_0$).

* * * * *